E. GATES.
Milk-Pails.

No. 148,045. Patented March 3, 1874.

Attest
T. C. Smith
Thos. Jewell

Inventor
Edwin Gates
per atty. A. M. & R. K. Evans

UNITED STATES PATENT OFFICE.

EDWIN GATES, OF NORTH LEOMINSTER, MASSACHUSETTS.

IMPROVEMENT IN MILK-PAILS.

Specification forming part of Letters Patent No. 148,045, dated March 3, 1874; application filed January 28, 1874.

*To all whom it may concern:*

Be it known that I, EDWIN GATES, of North Leominster, Worcester county and State of Massachusetts, have invented a new and useful Improvement in Milk-Pails, of which the following is a clear, full, and exact description, reference being had to the accompanying drawings, making a part of this specification, in which—

Figure 1:
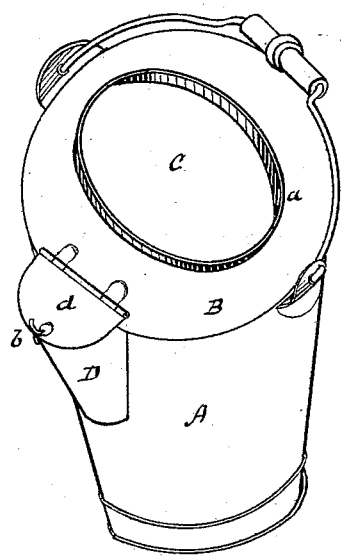
Figure 2:
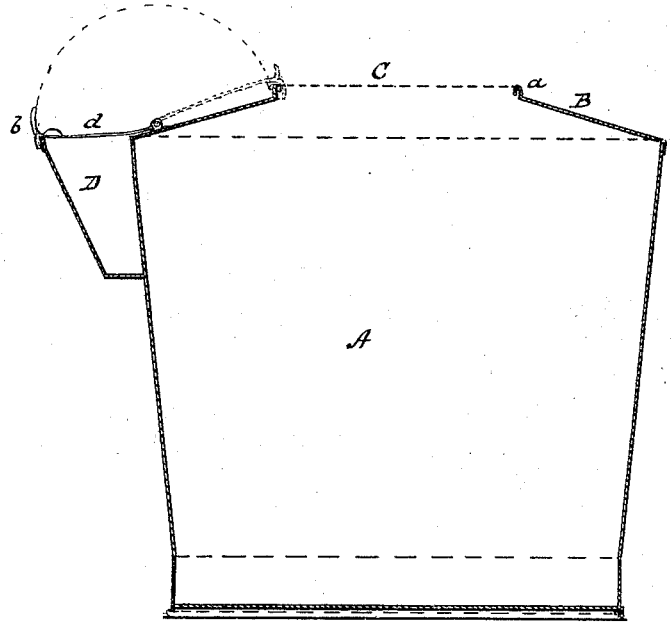

Figure 1 is a perspective view, and Fig. 2 is a vertical section.

My invention relates to that class of pails which are used in milking, and it consists in a combination of parts hereinafter explained.

In order that others skilled in the art may make and use my invention, I will proceed to describe the exact manner in which I have carried it out.

In the drawings, A represents the body of the pail, provided with the continuous guard B, having the elongated or oval opening, C. Around the opening C is a raised flange, $a$, for the purpose hereafter described. The opening C, instead of being made round, as is usual with milk-pails provided with continuous guards, is made oval or elongated, with a view to allow the milk from two teats to be milked into the pail at the same time.

The mouth D is provided with the hinged lid or cover $d$, which, when thrown back, rests on the guard B, and is held in position by the double catch $b$, as shown in Fig. 2. When the lid is over the mouth D, it is held snugly down by the double catch $b$, and securely closes the mouth, so as to prevent the milk from being spilled while the pail is being carried from place to place. When the lid is thrown back on the guard B, it is held by the catch $b$ snapping over the raised flange $a$, and the lid is thus secured against a liability to fall back and interfere with the pouring of the milk from the mouth of the pail.

Having thus described my invention, what I claim as new, and desire to secure by Letters Patent, is—

A milk-pail having the continuous guard B, provided with the raised flange $a$, and having an elongated opening, C, hinged cover $d$, and double catch $b$, substantially as and for the purpose set forth.

EDWIN GATES.

Witnesses:
 JONAS W. GATES,
 SYLVENDER F. MAYNARD.